US008827789B1

(12) United States Patent
Otomo

(10) Patent No.: US 8,827,789 B1
(45) Date of Patent: Sep. 9, 2014

(54) INFORMATION PROCESSING DEVICE, AND NON-TRANSITORY COMPUTER-READABLE STORAGE MEDIUM STORING GAME PROGRAM

(71) Applicant: DeNA Co., Ltd., Tokyo (JP)

(72) Inventor: Takahiro Otomo, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 14/158,649

(22) Filed: Jan. 17, 2014

(30) Foreign Application Priority Data

Mar. 27, 2013 (JP) ................................ 2013-066584

(51) Int. Cl.
*A63F 9/24* (2006.01)
*A63F 13/00* (2014.01)
*G07F 17/32* (2006.01)

(52) U.S. Cl.
CPC .................................. *G07F 17/3293* (2013.01)
USPC .............. 463/11; 463/16; 463/20; 273/138.1; 273/138.2; 273/143 R

(58) Field of Classification Search
CPC ....................................................... G07F 17/32
USPC ................. 463/11, 16, 20, 31, 42; 273/138.1, 273/138.2, 143 R
See application file for complete search history.

(56) References Cited

U.S. PATENT DOCUMENTS 5,401,023 A * 3/1995 Wood .............................. 463/13
5,511,781 A * 4/1996 Wood et al. ..................... 463/13
6,343,989 B1 * 2/2002 Wood et al. ..................... 463/23
6,884,168 B2 * 4/2005 Wood et al. ..................... 463/23
2010/0144415 A1 * 6/2010 Wolf et al. ...................... 463/13
2011/0281626 A1 * 11/2011 Moody et al. ................... 463/13
2013/0273991 A1 * 10/2013 Wolf et al. ...................... 463/13

FOREIGN PATENT DOCUMENTS

JP 07-039650 2/1995
JP 2010-522574 W 7/2010

OTHER PUBLICATIONS

Japanese Patent Application No. 2013-066584: Office Action mailed on Jul. 9, 2013.

"Kaito Royal Secret Poker", Famitsu mobage vol. 14, Kadokawa Corporation Enterbrain Brand Company, Mar. 9, 2013, pp. 14 to 16.

* cited by examiner

*Primary Examiner* — William M Brewster
*Assistant Examiner* — Ryan Hsu
(74) *Attorney, Agent, or Firm* — Procopio, Cory, Hargreaves & Savitch LLP

(57) ABSTRACT

An information processing device according to the present invention selects a predetermined number of game contents from multiple game contents stored in a storage unit to form a deck to be used in a game by a player. The information processing device determines a predetermined number or less of game contents out of the predetermined number of game contents included in the formed deck to be game contents to be replaced. The information processing device then generates a game screen including proposal information for recommending the player to replace the determined game contents to be replaced.

8 Claims, 15 Drawing Sheets

FIG. 4

| CARD ID | CHARACTER NAME | CHARACTER IMAGE | RARITY | SUIT ATTRIBUTE | INITIAL (Lv. 1) ATTACK STRENGTH | INITIAL (Lv. 1) DEFENSE STRENGTH |
|---|---|---|---|---|---|---|
| 0001 | SOLDIER A | 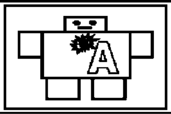 | COMMON | SPADE | 15 | 8 |
| 0002 | SOLDIER A | 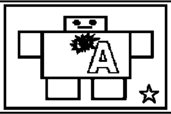 | UNCOMMON | SPADE | 20 | 15 |
| 0003 | SOLDIER A | 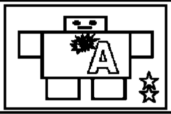 | RARE | SPADE | 100 | 60 |
| 0004 | SOLDIER A | 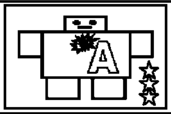 | SUPER RARE | SPADE | 200 | 180 |
| 0011 | SOLDIER B | 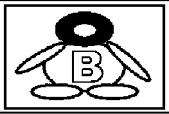 | COMMON | HEART | 10 | 5 |
| 0012 | SOLDIER B | 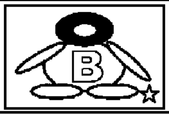 | UNCOMMON | HEART | 15 | 10 |
| 0013 | SOLDIER B | 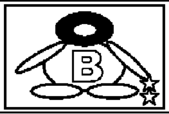 | RARE | HEART | 80 | 50 |
| . | . | . | . | . | . | . |
| . | . | . | . | . | . | . |
| . | . | . | . | . | . | . |
| 2591 | MAGICIAN Z | 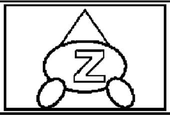 | COMMON | DIAMOND | 20 | 30 |
| 2592 | MAGICIAN Z | 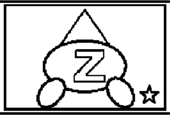 | UNCOMMON | DIAMOND | 50 | 75 |
| 2593 | MAGICIAN Z | 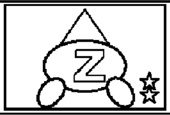 | RARE | DIAMOND | 60 | 100 |
| 2594 | MAGICIAN Z | 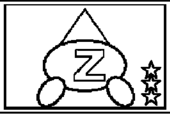 | SUPER-RARE | DIAMOND | 150 | 300 |

FIG. 5

| PLAYER ID | PLAYER NAME | POSSESSED CARD INFORMATION | FIRST DECK INFORMATION | SECOND DECK INFORMATION |
|---|---|---|---|---|
| 1 | A | POSSESSED CARD INFORMATION (1) | FIRST DECK INFORMATION (1) | SECOND DECK INFORMATION (1) |
| 2 | B | POSSESSED CARD INFORMATION (2) | FIRST DECK INFORMATION (2) | SECOND DECK INFORMATION (2) |
| 3 | C | POSSESSED CARD INFORMATION (3) | FIRST DECK INFORMATION (3) | SECOND DECK INFORMATION (3) |
| 4 | D | POSSESSED CARD INFORMATION (4) | FIRST DECK INFORMATION (4) | SECOND DECK INFORMATION (4) |
| 5 | E | POSSESSED CARD INFORMATION (5) | FIRST DECK INFORMATION (5) | SECOND DECK INFORMATION (5) |
| 6 | F | POSSESSED CARD INFORMATION (6) | FIRST DECK INFORMATION (6) | SECOND DECK INFORMATION (6) |
| . | . | . | . | . |
| . | . | . | . | . |
| . | . | . | . | . |

FIG. 6

POSSESSED CARD INFORMATION (3)

POSSESSED CARD INFORMATION (2)

POSSESSED CARD INFORMATION (1)

| POSSESSED CARD ID | LEVEL | ATTACK STRENGTH | DEFENSE STRENGTH | ACQUISITION DATE AND TIME |
|---|---|---|---|---|
| 0011 | LV. 3 | 15 | 10 | 2012/2/13 10:00 |
| 0211 | LV. 4 | 20 | 23 | 2012/2/13 12:00 |
| 0133 | LV. 1 | 70 | 45 | 2012/2/14 11:30 |
| 0201 | LV. 4 | 22 | 40 | 2012/2/15 18:00 |
| 0072 | LV. 7 | 60 | 50 | 2012/2/16 13:30 |
| 0094 | LV. 1 | 300 | 200 | 2012/2/16 19:00 |
| . | . | . | . | . |
| . | . | . | . | . |
| . | . | . | . | . |

FIG. 7

| SUIT ATTRIBUTE | NUMBER ATTRIBUTE | CARD ID | ATTACK STRENGTH |
|---|---|---|---|
| SPADE | A | 0101 | 1000 |
| | K | 0125 | 500 |
| | Q | 2674 | 400 |
| | J | 0056 | 300 |
| | 10 | 2250 | 200 |
| | 9 | 0005 | 100 |
| HEART | A | 0102 | 1000 |
| | K | 0152 | 500 |
| | Q | 2453 | 400 |
| | J | 0007 | 300 |
| | 10 | 1301 | 200 |
| | 9 | 0031 | 100 |
| CLUB | A | 0221 | 1000 |
| | K | 0346 | 500 |
| | Q | 1264 | 400 |
| | J | 0072 | 300 |
| | 10 | 1001 | 200 |
| | 9 | 0906 | 100 |
| DIAMOND | A | 0201 | 1000 |
| | K | 0436 | 500 |
| | Q | 1043 | 400 |
| | J | 0082 | 300 |
| | 10 | 2133 | 200 |
| | 9 | 0003 | 100 |

FIG. 8

| AREA ID | CARD ID |
|---|---|
| 1 | 0003 |
| 2 | 0031 |
| 3 | 0005 |
| 4 | 1001 |
| 5 | 0101 |

FIG. 9

| CARD HAND (POKER) | MULTIPLIER VALUE |
|---|---|
| ROYAL STRAIGHT FLUSH | 2.5 |
| STRAIGHT FLUSH | 2.0 |
| FOUR OF A KIND | 1.8 |
| FULL HOUSE | 1.6 |
| FLUSH | 1.5 |
| STRAIGHT | 1.4 |
| THREE OF A KIND | 1.3 |
| TWO PAIR | 1.2 |
| ONE PAIR | 1.1 |

FIG. 15

| | 9 OF DIAMONDS | 9 OF HEARTS | 9 OF SPADES | 10 OF CLUBS | A OF SPADES | EXPECTED VALUE OF EFFECTIVE ATTACK STRENGTH |
|---|---|---|---|---|---|---|
| REPLACE 0 CARDS | 100 | 100 | 100 | 200 | 1000 | 1950 |
| REPLACE 1 CARD | REPLACE | 100 | 100 | 200 | 1000 | 2280 |
| | 100 | REPLACE | 100 | 200 | 1000 | 2280 |
| | 100 | 100 | REPLACE | 200 | 1000 | 2280 |
| | 100 | 100 | 100 | REPLACE | 1000 | 2430 |
| | 100 | 100 | 100 | 200 | REPLACE | 1350 |
| REPLACE 2 CARDS | REPLACE | REPLACE | 100 | 200 | 1000 | 2875 |
| | REPLACE | 100 | REPLACE | 200 | 1000 | 2645 |
| | REPLACE | 100 | 100 | REPLACE | 1000 | 2750 |
| . | . | . | . | . | . | . |
| . | . | . | . | . | . | . |
| . | . | . | . | . | . | . |
| | 100 | 100 | 100 | REPLACE | REPLACE | 1885 |
| REPLACE 3 CARDS | REPLACE | REPLACE | REPLACE | 200 | 1000 | 3510 |
| | REPLACE | REPLACE | 100 | REPLACE | 1000 | 3250 |
| | REPLACE | REPLACE | 100 | 200 | REPLACE | 2250 |
| . | . | . | . | . | . | . |
| . | . | . | . | . | . | . |
| . | . | . | . | . | . | . |
| REPLACE 4 CARDS | REPLACE | REPLACE | REPLACE | REPLACE | 1000 | 3600 |
| | REPLACE | REPLACE | REPLACE | 200 | REPLACE | 2640 |
| . | . | . | . | . | . | . |
| . | . | . | . | . | . | . |
| . | . | . | . | . | . | . |
| REPLACE 5 CARDS | REPLACE | REPLACE | REPLACE | REPLACE | REPLACE | 3000 |

(4)

INFORMATION PROCESSING DEVICE, AND NON-TRANSITORY COMPUTER-READABLE STORAGE MEDIUM STORING GAME PROGRAM

BACKGROUND OF THE INVENTION

1. Field of the Invention

The present invention relates to an information processing device and a game program.

2. Description of Related Art

Game devices configured to replace a game content selected by a player out of game contents that the player has with another game content have been known (for example, JP 7-39650 A).

SUMMARY OF THE INVENTION

In replacing a game content a player has with another game content, it may be difficult to determine which game content to be replaced (or not to be replaced) among the game contents the player has in some cases.

The present invention has been made in view of the foregoing, and an objective is to make it easier for a player to select game contents to be replaced.

A principal invention of the present invention to solve the aforementioned problems is an information processing device including:

a storage unit configured to store multiple game contents;

a deck forming unit configured to select a predetermined number of game contents from the multiple game contents to form a deck to be used in a game by a player;

a replacement content determination unit configured to determine a predetermined number or less of game contents out of the predetermined number of game contents included in the deck to be game contents to be replaced; and a screen data generation unit configured to generate data of a game screen containing proposal information recommending the player to replace the game contents to be replaced.

Other features of the present invention will be apparent from the description of the present specification and the appended drawings.

Advantageous Effect of the Invention

According to the present invention, selection of game contents to be replaced can be made easier for a player.

BRIEF DESCRIPTION OF THE DRAWINGS

FIG. 4 is a table illustrating an example of a data structure of card information;

FIG. 5 is a diagram illustrating an example of a data structure of player information;

FIG. 6 is a table illustrating an example of a data structure of possessed card information;

FIG. 7 is a table illustrating an example of a data structure of first deck information;

FIG. 8 is a table illustrating an example of a data structure of second deck information;

FIG. 9 is a table explaining card hand information;

FIG. 15 is a table explaining patterns of battle decks formed as a result of replacement of game cards.

DETAILED DESCRIPTION OF THE INVENTION

Figure 1:
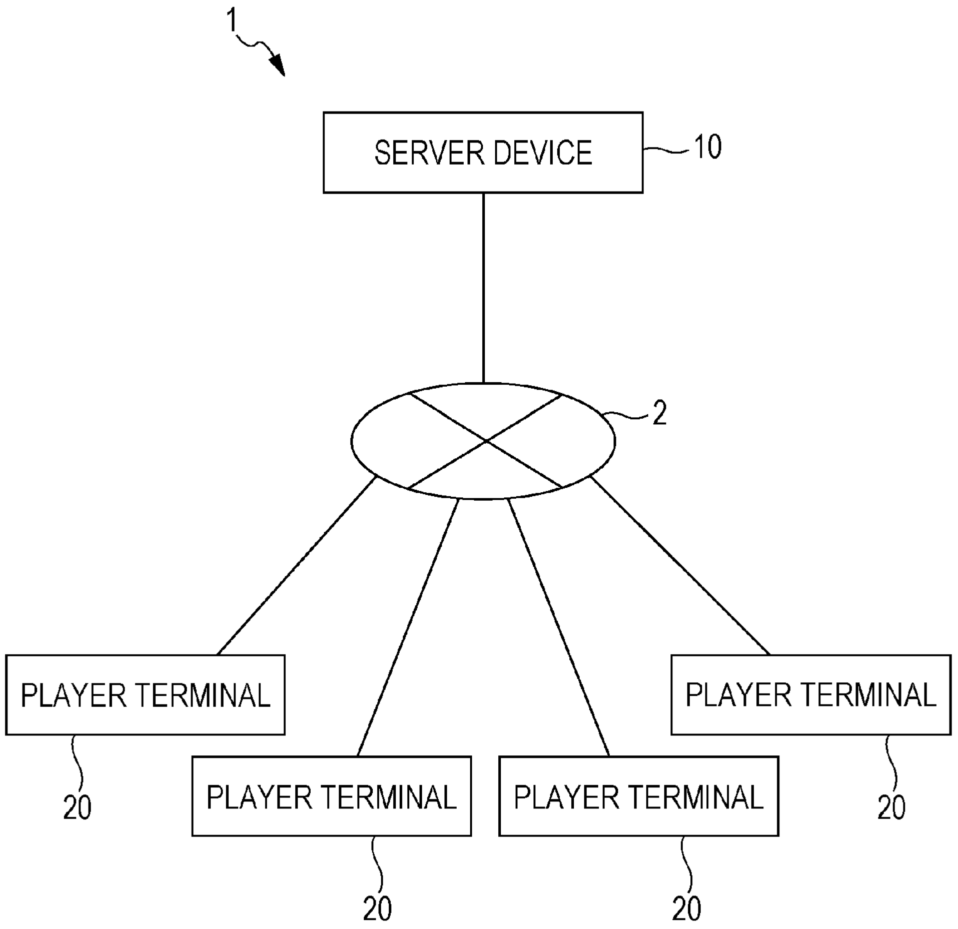
FIG. 1 is a diagram illustrating an overall configuration example of a game system.

At least the following matters will be apparent according to the description of the present specification and the appended drawings:

An information processing device including:

a storage unit configured to store multiple game contents;

a deck forming unit configured to select a predetermined number of game contents from the multiple game contents to form a deck to be used in a game by a player;

a replacement content determination unit configured to determine a predetermined number or less of game contents out of the predetermined number of game contents included in the deck to be game contents to be replaced; and a screen data generation unit configured to generate data of a game screen containing proposal information recommending the player to replace the game contents to be replaced.

According to such an information processing device, the proposal information is displayed on the game screen, allowing the player to easily select game contents to be replaced.

In such an information processing device, the replacement content determination unit may select a predetermined number or less of replacement candidate game contents out of the predetermined number of game contents included in the deck, calculate, for each pattern of possible decks that can be formed if the selected replacement candidate game contents are replaced, an expected value of the effective parameter value of each of the possible decks by using parameter values set for each of the patterns of game contents included in the possible deck, and determine the replacement candidate game contents with a highest expected value of the effective parameter value to be the game contents to be replaced.

According to such an information processing device, game contents to be replaced can be determined so as to be most advantageous to the player.

In such an information processing device, the replacement content determination unit may select a predetermined number or less of replacement candidate game contents out of the predetermined number of game contents included in the deck, calculate, for each pattern of possible decks that can be formed if the selected replacement candidate game contents are replaced, an expected value of the effective parameter value of each of the possible decks by using parameter values set for each of the patterns of game contents included in the possible deck, and determine some or all patterns of replacement candidates with high calculated expected values of the effective parameter values to be the game contents to be replaced.

According to such an information processing device, game contents to be replaced can be determined so as to be advantageous to the player.

In such an information processing device, the deck forming unit may select a predetermined number of game contents from the multiple game contents to form a player's deck to be used in a game by a player and form an opponent's deck to be used in the game by an opponent, the replacement content determination unit may calculate an effective parameter value of the player's deck by using parameter values set for the respective game contents included in the player's deck and calculates an effective parameter value of the opponent's deck by using parameter values set for the respective game contents included in the opponent's deck, the information processing device may further include a determination unit configured to determine whether or not the effective parameter value of the opponent's deck is greater than that of the player's deck, and when the effective parameter value of the opponent's deck is determined to be greater than that of the player's deck, the replacement content determination unit may further determine game contents to be replaced from the player's deck.

According to such an information processing device, it is possible to determine game contents to be replaced from the player's deck and recommend the player to replace the game contents to be replaced when it is determined that the player is disadvantageous, which allows the player to easily perform the selection.

In such an information processing device, the deck forming unit may select a predetermined number of game contents from the multiple game contents to form a player's deck to be used in a game by a player and form an opponent's deck to be used in the game by an opponent, the replacement content determination unit may calculate an effective parameter value of the opponent's deck by using parameter values set for the respective game contents included in the opponent's deck, select a predetermined number or less of replacement candidate game contents out of the predetermined number of game contents included in the player's deck, calculate, for each pattern of possible player's decks that can be formed if the selected replacement candidate game contents are replaced, an assumed effective parameter value of the possible player's deck by using parameter values set for each of game contents included in the possible player's deck of each pattern, and determine the replacement candidate game contents for a possible player's deck with the assumed effective parameter value higher than the effective parameter value of the opponent's deck to be the game contents to be replaced.

According to such an information processing device, game contents to be replaced can be determined so that the player's deck will be advantageous than the opponent's deck.

In such an information processing device, the replacement content determination unit may select replacement candidate game contents out of the predetermined number of game contents included in the deck according to a selection input of the player, calculate an expected value of an effective parameter value of possible decks that can be formed if the selected replacement candidate game contents are replaced, and the screen data generation unit may generate a game screen containing the calculated expected value of the effective parameter value before the replacement candidate game contents are determined to be game contents to be replaced according to input operation of the player.

According to such an information processing device, the expected value of the effective parameter value of possible decks is displayed on the game screen, allowing the player to easily select game contents to be replaced.

Furthermore, provided is a non-transitory computer-readable storage medium storing a game program causing a computer to execute:

a storage process of storing multiple game contents in a storage unit;

a deck forming process of selecting a predetermined number of game contents from the multiple game contents to form a deck to be used in a game by a player;

a replacement game content determination process of determining a predetermined number or less of game contents out of the predetermined number of game contents included in the deck to be game contents to be replaced; and a screen data generation process of generating data of a game screen containing proposal information recommending the player to replace the game contents to be replaced.

Such a game program allows the player to easily select game contents to be replaced.

Embodiment

<<Configuration of Game System 1>>

FIG. 1 is a diagram illustrating an example of an overall configuration of a game system 1 according to the present embodiment. The game system 1 provides players with various services related to games through a network 2 (for example, the Internet), and includes a server device 10 and a plurality of player terminals 20.

<<Configuration of Server Device 10>>

Figure 2:
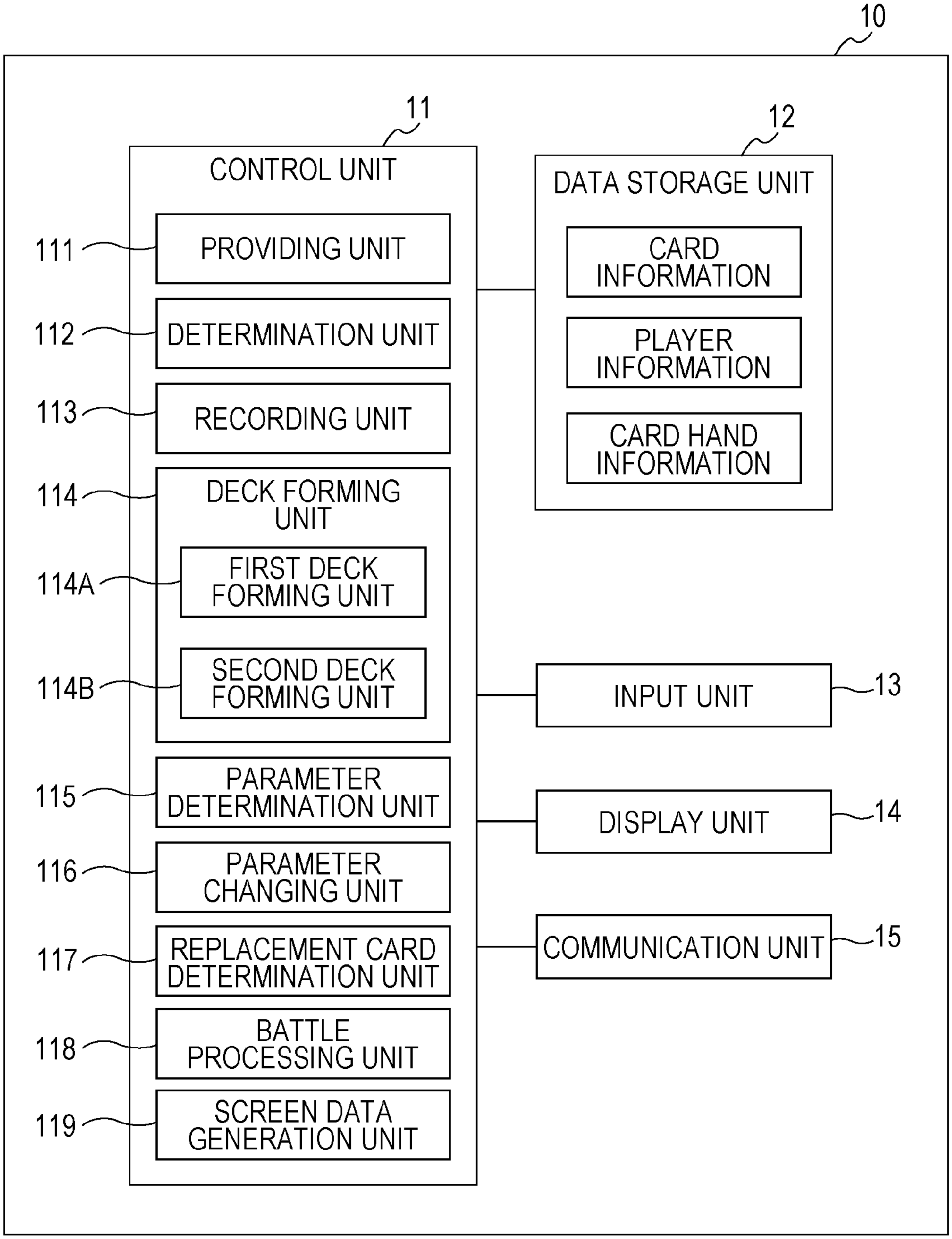
FIG. 2 is a block diagram illustrating a functional configuration of a server device.

FIG. 2 is a block diagram illustrating a functional configuration of the server device 10 according to the present embodiment. The server device 10 is an information processing device (for example, a workstation, a personal computer, or the like) used when a system administrator or the like manages a game service. The server device 10 can distribute game programs operable on a player terminal 20, and web pages (such as game screens) made in a markup language (such as HTML) according to the specification of the player terminal 20 upon receiving various commands (requests) from the player terminals 20. The server device 10 includes a control unit 11, a data storage unit 12, an input unit 13, a display unit 14, and a communication unit 15.

The control unit 11 is configured to pass data among the units and control the entire server device 10, and is realized by a central processing unit (CPU) executing a program stored in a predetermined memory. The control unit 11 of the present embodiment includes a providing unit 111, a determination unit 112, a recording unit 113, a deck forming unit 114, a parameter determination unit 115, a parameter changing unit 116, a replacement card determination unit 117, a battle processing unit 118, and a screen data generation unit 119.

The providing unit 111 includes a function to execute a process of providing a player with a game content to be used in a game. A game content refers to a game card, a figure or the like associated with a character or the like, or an item or the like such as a tool or an ability that can be used in a game. The providing unit 111 of the present embodiment provides a game card as the game content to be used in a virtual space in a game.

The determination unit 112 has a function to execute various determination processes such as a process of determining whether or not a parameter change condition, which will be described later, is satisfied, and a process of determining whether or not an effective ability value of an opponent's deck is larger than that of a player's deck.

The recording unit 113 is connected to the data storage unit 12 via a bus, and has a function to execute a recording process of recording data into the data storage unit 12 in response to a command from the control unit 11.

The deck forming unit 114 has a function to form a deck composed of multiple game cards. A deck refers to a card group of multiple cards put into a set. The deck forming unit 114 includes a first deck forming unit 114A and a second deck forming unit 114B.

The first deck forming unit 114A has a function to form a first deck composed of multiple game cards selected from game cards possessed by a player. In the present embodiment, a preliminary deck that is an example of the first deck is formed. A preliminary deck is a deck composed of game cards that are candidates to be selected for forming a battle deck and that are to be used for forming a predetermined hand, which will be described later.

The second deck forming unit 114B has a function to form a second deck composed of multiple game cards selected from the game cards included in the first deck. In the present embodiment, a battle deck that is an example of the second deck is formed. A battle deck is a deck used for a battle and composed of a smaller number of game cards than the number of game cards included in the preliminary deck.

The parameter determination unit 115 has a function to determine the value of a deck parameter set for a deck on the basis of the values of card parameters set for the respective game cards composing the deck.

The parameter changing unit 116 has a function to change the value of the deck parameter determined by the parameter determination unit 115 when the parameter change condition, which will be described later, is satisfied.

The replacement card determination unit 117 has a function to execute a process of determining a predetermined number or smaller number of game cards to be replaced (hereinafter also referred to as "replacement card) out of a predetermined number of game cards composing a deck used by the player in a game. The replacement card determination unit 117 of the present embodiment determines five or less replacement cards out of five game cards composing a battle deck.

The battle processing unit 118 has a function to execute a battle game process of making a battle deck of a player compete against a battle deck of an opponent. The battle processing unit 118 of the present embodiment determines the outcome of a battle game by using the deck parameter value resulting from the change by the parameter changing unit 116 when the parameter change condition to be described later is satisfied, and determines the outcome of a battle game by using the deck parameter value resulting from the determination by the parameter determination unit 115 when the parameter change condition to be described later is not satisfied.

The screen data generation unit 119 has a function to execute a process of generating screen data for displaying an operation screen and a game screen for allowing the player to play games on the player terminal 20. The screen data generation unit 119 of the present embodiment generates HTML data as the screen data corresponding to the game screen.

The data storage unit 12 includes a read only memory (ROM) that is a read only storage area in which a system program is stored, and a random access memory (RAM) that is a rewritable storage area used as a work area for arithmetic processing by the control unit 11. The data storage unit 12 is, for example, realized by a non-volatile storage device, such as flash memory or a hard disk. The data storage unit 12 of the present embodiment stores at least card information that is information on game cards that are an example of the game contents, player information that is information on the player, and card hand information. Details of the information will be described later.

The input unit 13 is used by the system administrator or the like for inputting various data (for example, the card information or the like), and is realized, for example, by a keyboard, a mouse, and the like.

The display unit 14 is used for displaying an operation screen for the system administrator on the basis of a command from the control unit 11, and is realized, for example, by a liquid crystal display (LCD) or the like.

The communication unit 15 is used for performing communication with the player terminals 20, and has a function as a reception unit to receive various data and signals transmitted from the player terminals 20, and a function as a transmission unit to transmit various data and signals to the player terminals 20 according to commands from the control unit 11. The communication unit 15 is realized, for example, by a network interface card (NIC), or the like.

<<Configuration of Player Terminal 20>>

Figure 3:
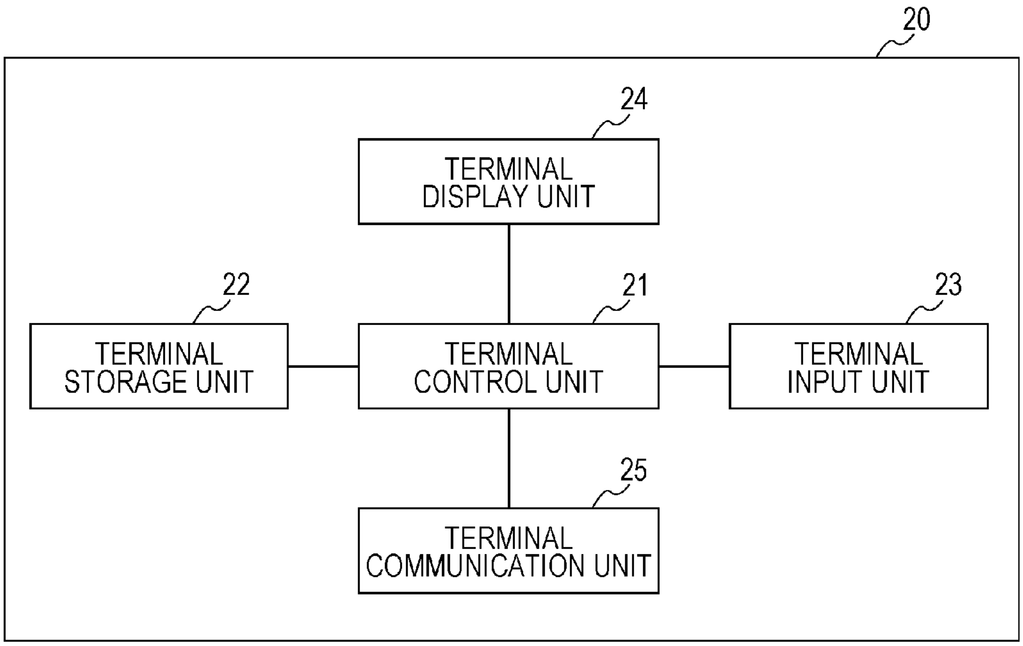
FIG. 3 is a block diagram illustrating a functional configuration of a player terminal.

FIG. 3 is a block diagram illustrating a functional configuration of the player terminal 20. The player terminal 20 of the present embodiment is an information processing device (for example, a mobile phone terminal, a smart phone, or the like) used by the player when playing a game, and can request the server device 10 to deliver various types of information (a game program, a web page, or the like) related to the game. The player terminal 20 has a web browser function for allowing the player to browse a web page, and thus can display a web page (a game screen, or the like) delivered from the server device 10. The player terminal 20 includes a terminal control unit 21, a terminal storage unit 22, a terminal input unit 23, a terminal display unit 24, and a terminal communication unit 25.

The terminal control unit 21 is configured to pass data among the units and control the entire player terminal 20, and is realized by a central processing unit (CPU) executing a program stored in a predetermined memory. Note that the terminal control unit 21 of the present embodiment also functions as a screen display control unit that controls the display format of a game screen displayed on the terminal display unit 24. The terminal storage unit 22 is connected to the terminal control unit 21 through a bus, and performs processing of referring to, reading out, and rewriting stored data according to a command from the terminal control unit 21. The terminal storage unit 22 is realized, for example, by flash memory, a hard disk, or the like. The terminal input unit 23 is used for performing various operations (a game operation, and the like) by the player, and is realized, for example, by an operation button, a touch panel, and the like. The terminal display unit 24 is used for displaying a game screen according to a command from the terminal control unit 21, and is realized, for example, by a liquid crystal display (LCD) and the like. The terminal communication unit 25 functions as a transmission/reception unit for transmitting/receiving various types of information to/from the server device 10 through the network 2, and is realized, for example, by a network interface card (NIC), or the like.

<<Data Structure>>

FIG. 4 is a diagram illustrating an example of a data structure of the card information stored in the data storage unit 12 of the server device 10. The card information contains items (fields) such as a card ID, a character name, a character image, rarity, a suit attribute that is an example of the first attribute, an initial attack strength, an initial defense strength, and an initial hit point. The card ID is identification information for identifying a game card that is an example of the game content. The character name is information indicating a display name of a character associated with a game card. The character image is image data of a character. The rarity is information indicating the degree of rarity classified into a plurality of classes according to a rarity value of a game card. In the present embodiment, four classes of rarity ("common"→"uncommon"→"rare"→"super rare") are set for game cards (characters), and the rarity is identified by the last digit of a card ID, for example. The suit attribute is attribute information indicating a kind of suits assigned in advance to a game card. In the present embodiment, any one of four suits (spade, heart, club, and diamond) is set for a game card. The initial attack strength, the initial defense strength, and the initial hit point of a character are parameters indicating ability values initially set for the character.

FIG. 5 is a diagram illustrating an example of a data structure of the player information stored in the data storage unit 12 of the server device 10. The player information contains items such as a player ID, a player name, possessed card information, first deck information, second deck information, and the like. The player ID is identification information for identifying a player. The player name is information indicating a display name of a player. The possessed card information is information indicating game cards (hereinafter also referred to as possessed cards) possessed by a player. The first deck information is information on a first deck formed by the first deck forming unit 114A. The second deck information is information on a second deck formed by the second deck forming unit 114B.

FIG. 6 is a table illustrating an example of a data structure of the possessed card information. The possessed card information contains items such as a possessed card ID, the level of a possessed card, an attack strength, a defense strength, acquisition date and time, and the like. The possessed card ID is identification information for identifying a possessed card. The possessed card level, the attack strength, and the defense strength are parameters (card parameters) indicating ability values set for a character associated with a possessed card. These parameters are updated according to a result of a battle game or the like. The acquisition date and time is information indicating the date and time at which a player acquired a possessed card.

FIG. 7 is a table illustrating an example of a data structure of the first deck information. The first deck information is information defining a preliminary deck that is an example of the first deck, which is information of a predetermined number of game cards put into a set. The first deck information contains items such as a suit attribute that is an example of the first attribute, a number attribute that is an example of the second attribute, and a card ID for identifying each of game cards included in a preliminary deck. The preliminary deck of the present embodiment includes 24 kinds of game cards in combination of four suit attributes, which are spade, heart, club and diamond, and six number attributes, which are 9, 10, 11 (jack: J), 12 (queen: Q), 13 (king: K), and 1 (ace: A), put into a set.

FIG. 8 is a table illustrating an example of a data structure of the second deck information. The second deck information is information defining a battle deck that is an example of the second deck, which is information of a predetermined number of game cards put into a set. The second deck information contains items of an area ID and a card ID. The area ID is identification information for identifying a unit area in a card placement area. The card placement area of the present embodiment is divided into five unit areas (see FIG. 13 (2)), and five area IDs are thus set. The card ID is identification information for identifying each of game cards included in a battle deck. The battle deck of the present embodiment includes five game cards to be placed on respective unit areas and put into a set.

FIG. 9 is a diagram illustrating an example of a data structure of the card hand information stored in the data storage unit 12 of the server device 10. The card hand information is information associating a multiplier value (predetermined value) with each card hand (predetermined hand). The card hand is information indicating a preset combination of game cards. The multiplier value is a value (a value specifying the multiplying factor) by which the deck parameter value determined by the parameter determination unit 115 is multiplied. In the data structure of the present embodiment, a card hand that is more difficult to make in a normal poker game has a larger multiplier value.

<<Game Outline>>

Here, an outline of a game provided by the game system 1 of the present embodiment will be described. The game system 1 provides various games conducted by using game cards (virtual cards used in a virtual space of a game).

In the game system 1 of the present embodiment, a player can possess a plurality of game cards each being associated with a character. The player can play a battle game by using a battle deck composed of the game cards that the player possesses.

In the battle game of the present embodiment, a poker game using the battle deck is conducted. The poker game of the present embodiment is conducted by using 24 game cards selected from the game cards that the player possesses unlike the poker game conducted by using 52 cards such as the actual playing cards. Specifically, 24 game cards in combination of four suit attributes (spade, heart, club, and diamond) and six number attributes (1, 9 to 13) are used instead of 52 playing cards in combination of four suit attributes (spade, heart, club, and diamond) and 13 number attributes (1 to 13).

Upon start of the battle game, 24 game cards are selected from the game cards that the player possesses to form a preliminary deck that is a talon for the player. Five cards are then randomly selected from the preliminary deck composed of 24 game cards to form a battle deck composed of five game cards that constitute a hand. As a result of limiting the number of game cards included in a preliminary deck to 24 (24 kinds) in this manner, possible kinds of hands (also referred to as poker hands) of the poker game are also limited and the kinds of game cards that are candidates for selection in formation of a battle deck are also limited. A battle deck can thus easily make a poker hand.

If a poker hand is not made after the battle deck that constitute a hand is formed, the player can select five or less game cards to be replaced (replacement cards) out of the five game cards in the battle deck. A replacement card selected by the player is changed to a game card selected from the 19 game cards remaining in the preliminary deck. As a result of replacing game cards, a new battle deck of the player is formed.

Note that, when the game cards in hand are to be replaced, it may be difficult for the player to determine which game cards out of the five game cards of the battle deck should be selected as replacement cards taking possible poker hands into consideration. Thus, in the poker game of the present embodiment, a function to automatically determine five or less replacement cards out of the five game cards in the battle deck and recommend the player to replace the determined replacement cards. As a result, the player can easily select the replacement cards.

The player makes his/her battle deck thus formed compete against a battle deck of an opponent, and if the player's battle deck composed of five game cards can make a preset poker hand, the player can gain a reward depending on the kind of the poker hand.

<<Operation of Game System 1>>

Figure 10:
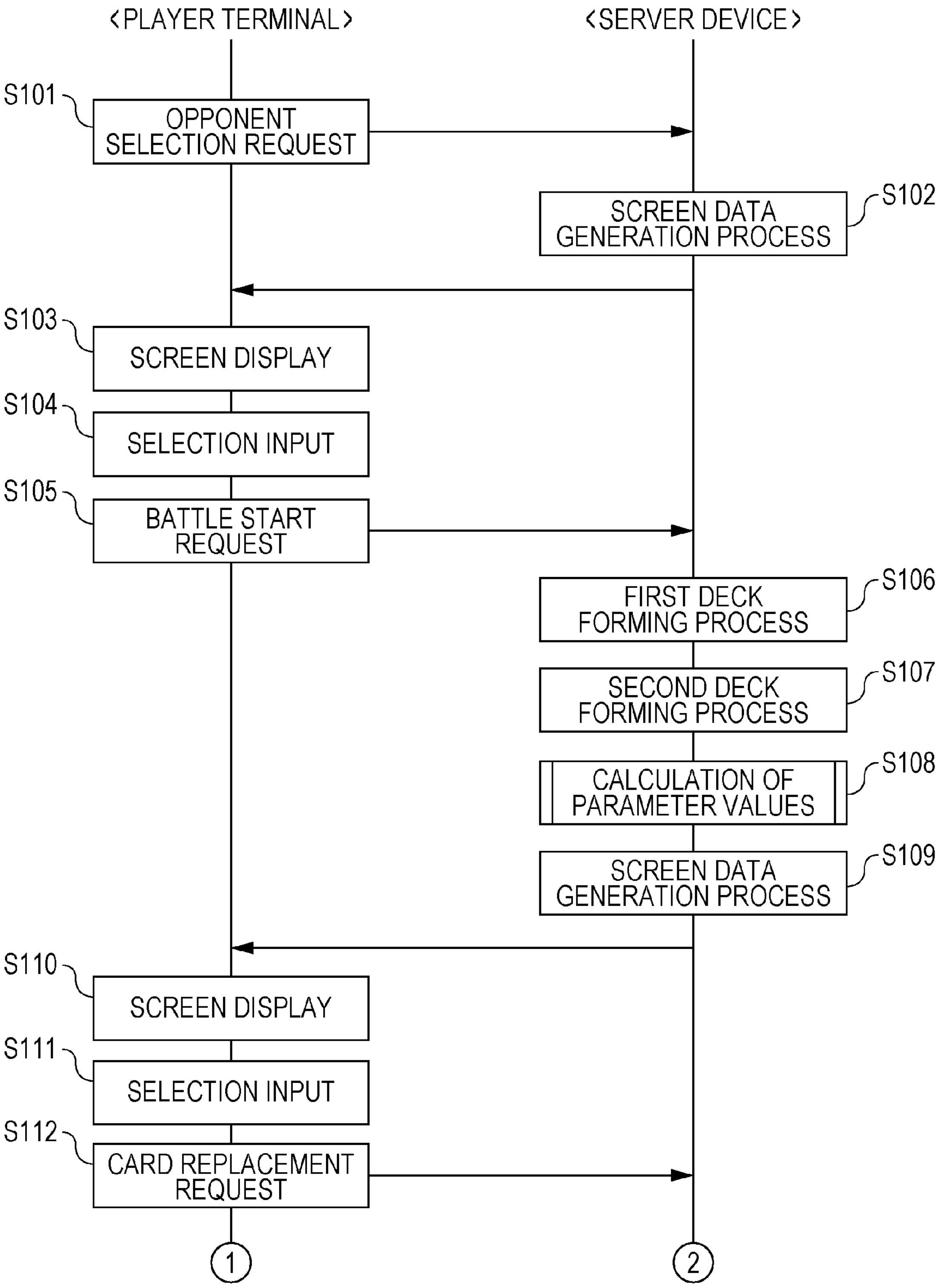
FIG. 10 is a flowchart explaining an example of operation (first half) of the game system.
Figure 11:
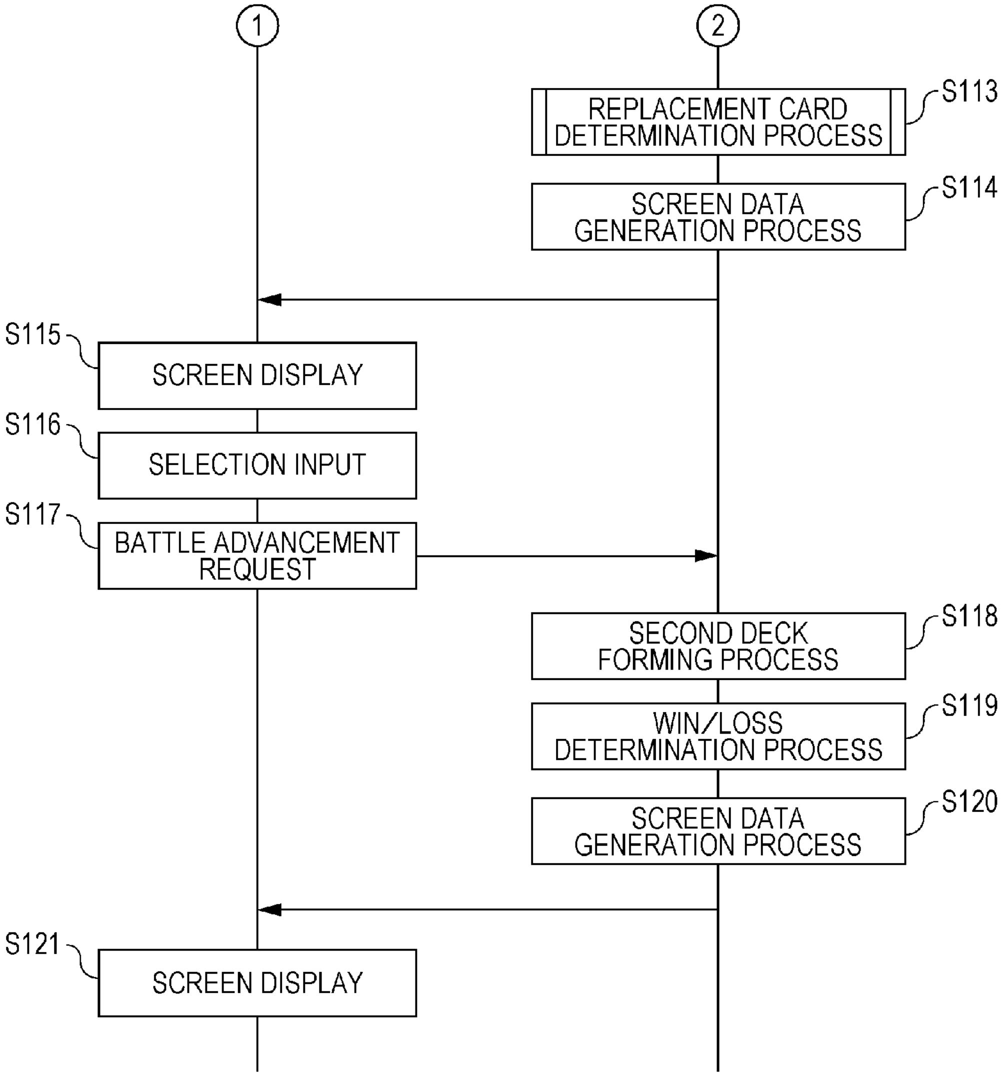
FIG. 11 is a flowchart explaining an example of operation (second half) of the game system.

FIGS. 10 and 11 are flowcharts for explaining an example of operation of the game system 1 according to the present embodiment.

As illustrated in FIG. 10, first, in a player terminal 20, upon receiving an operation input made by the player from the terminal input unit 23, the terminal control unit 21 transmits a command (opponent selection request) for acquiring a web page for selecting an opponent to the server device 10 via the terminal communication unit 25 (S101).

Subsequently, upon receiving the opponent selection request transmitted from the player terminal 20, the server device 10 causes the screen data generation unit 119 to generate screen data (HTML data) for displaying an opponent selection screen 50 (see FIG. 12 (1)), which will be described later, on the player terminal 20 (S102). The server device 10 then transmits the screen data (HTML data) generated by the screen data generation unit 119 to the requesting player terminal 20 via the communication unit 15.

Subsequently, upon receiving the screen data (HTML data) transmitted from the server device 10, the player terminal 20 analyzes the screen data to display a game screen corresponding to the screen data on the terminal display unit 24 (S103).

Figure 12:
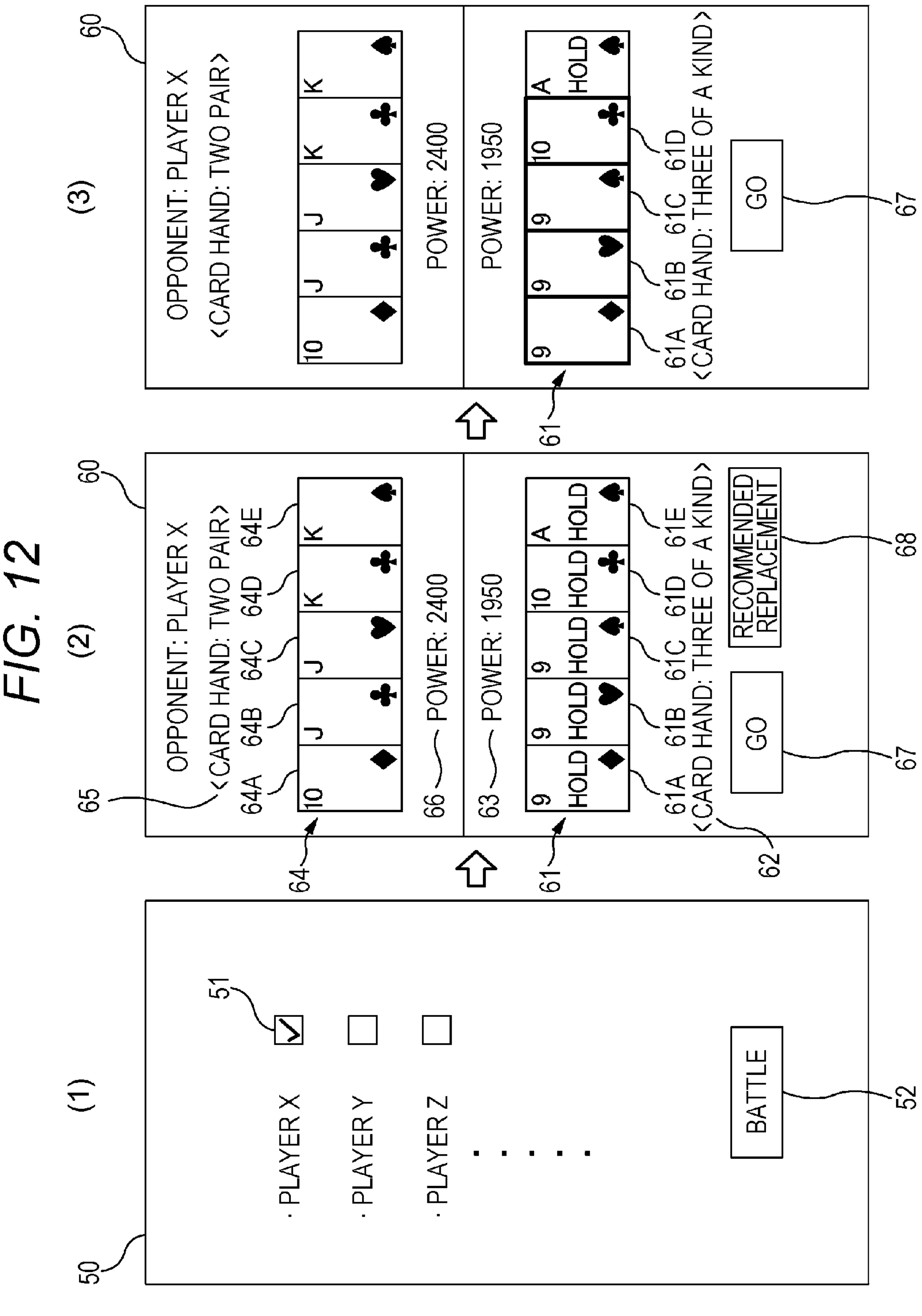
FIGS. 12(1) to 12(3) are diagrams explaining screen transition (first half) in a battle game.

FIG. 12 (1) is a diagram illustrating an example of the opponent selection screen 50 displayed on the terminal display unit 24. The opponent selection screen 50 is a game screen for selecting an opponent and includes check boxes 51 for specifying an opponent from a list and an operation button 52 for starting a battle. The player terminal 20 receives operation inputs relating to selection of an opponent and start of a battle from the player while the opponent selection screen 50 is displayed on the terminal display unit 24 (S104). It is assumed here that a "player X" is specified as the opponent for the player as a result of selection of a check box 51 and that a battle is then started as a result of selection of the operation button 52. Thereafter, the player terminal 20 transmits a battle start request in which the operation information is set to the server device 10 (S105). Upon receiving the request, the server device 10 starts a battle game with the opponent specified by the player. In the present embodiment, the battle processing unit 118 executes a battle game process for a poker game to determine the outcome.

In the battle game process for the poker game, the server device 10 first causes the first deck forming unit 114A to execute a first deck forming process (S106). The first deck forming unit 114A refers to the player information illustrated in FIG. 5 and the possessed card information illustrated in FIG. 6, and selects a plurality of game cards from the cards possessed by the player to form a deck for the player. The first deck forming unit 114A also forms a deck for the opponent at the same time. In the present embodiment, since each possessed card has any one of the four suit attributes of spade, heart, club, and diamond, six possessed cards are selected for each suit attribute. In this process, the first deck forming unit 114A automatically selects six possessed cards on the basis of a card parameter value set for each possessed card. Specifically, the first deck forming unit 114A refers to the card information illustrated in FIG. 4 and the possessed card information illustrated in FIG. 6 and selects six possessed cards in descending order of the attack strength parameter value for each suit attribute. Alternatively, the first deck forming unit 114A may select possessed cards specified by the player in response to operation input from the player instead of automatic selection mentioned above. The first deck forming unit 114A then assigns any one of six number attributes of 9, 10, 11 (jack: J), 12 (queen: Q), 13 (king: K), and 1 (ace: A) to each of the six selected possessed cards of each suit attribute. The first deck forming unit 114A then forms a preliminary deck composed of 24 game cards in combination of four suit attributes and six number attributes put into a set for each of the player and the opponent. After the preliminary decks are formed in this manner, the first deck information illustrated in FIG. 7 is stored in the data storage unit 12 of the server device 10.

Subsequently, the server device 10 causes the second deck forming unit 114B to execute a second deck forming process (S107). The second deck forming unit 114B refers to the player information illustrated in FIG. 5 and the first deck information illustrated in FIG. 7 to select a plurality of game cards from the preliminary deck for the player and a plurality of game cards from the preliminary deck for the opponent. In the present embodiment, five game cards are randomly selected from the 24 game cards included in the preliminary deck. The second deck forming unit 114B then associates the five selected game cards with unit areas, respectively, constituting a card placement area. The second deck forming unit 114B then forms a battle deck of five game cards put into a set for each of the player and the opponent. After the battle decks are formed in this manner, the second deck information illustrated in FIG. 8 is stored in the data storage unit 12 of the server device 10.

Subsequently, the server device 10 executes a process of calculating deck parameter values set for the battle decks formed in this manner (S108). Hereinafter, the calculation process will be described more specifically.

Figure 13:
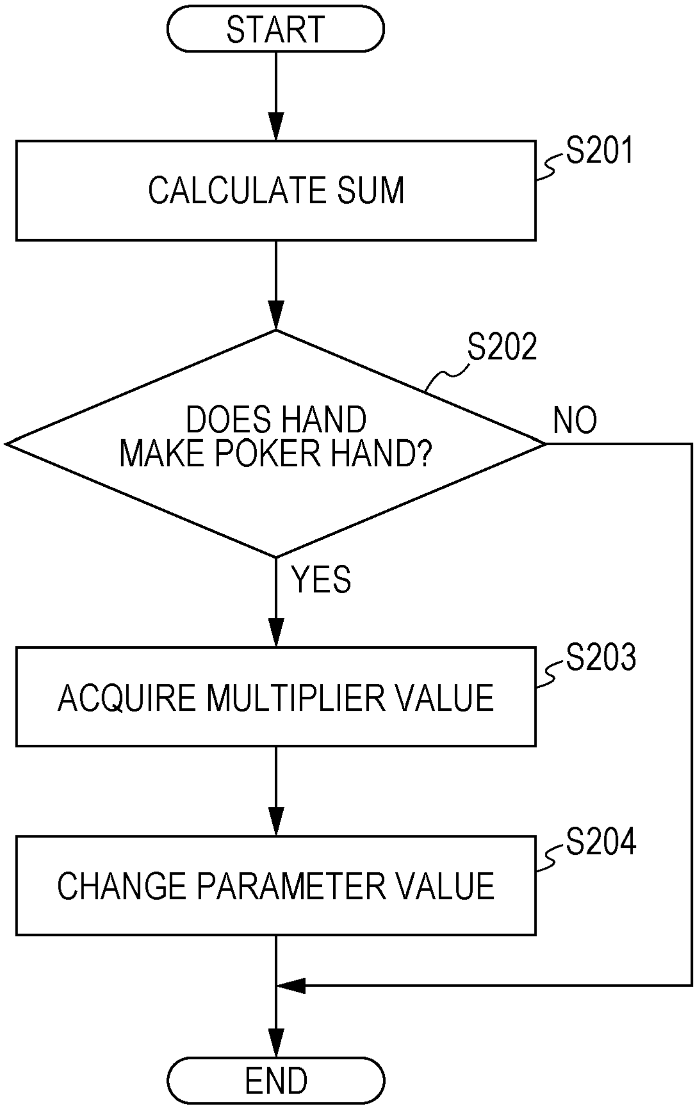
FIG. 13 is a flowchart explaining a deck parameter calculation process.

FIG. 13 is a flowchart for explaining the process for calculating the deck parameters set for the battle decks.

First, the parameter determination unit 115 refers to the player information illustrated in FIG. 5, the possessed card information illustrated in FIG. 6, and the second deck information illustrated in FIG. 8 to acquire the card parameter value of each of the game cards included in the battle deck of the player (here, the attack strength parameter value is acquired), and calculates the sum of all the card parameter values (S201). Similarly for the battle deck of the opponent, the parameter determination unit 115 calculates the sum of all the card parameter values. The parameter determination unit 115 then determines the sum of card parameter values thus calculated to be the deck parameter value set for the battle deck.

Alternatively, in S201, the deck parameter value set for the battle deck may be determined by acquiring the card parameter value of each of the game cards (24 game cards) included in the preliminary deck, calculating the sum of all of the card parameter values, and determining the sum to be the deck parameter value set for the battle deck.

Subsequently, the determination unit 112 determines whether or not the parameter change condition is satisfied, that is, whether or not each of the battle decks of the player and the opponent makes a preset poker hand (S202).

If a poker hand is not made (S202: NO), this process is terminated. If, on the other hand, a poker hand is made (S202: YES), the parameter changing unit 116 refers to the card hand information illustrated in FIG. 9 to acquire the multiplier value associated with the poker hand (S203).

Subsequently, the parameter changing unit 116 changes the deck parameter value determined by the parameter determination unit 115 (S204). For example, if a poker hand "one pair" is made by the battle deck when the deck parameter value is "10000", the multiplier value is "1.1" (see FIG. 9), and thus the deck parameter value is changed to 11000.

Referring back to FIG. 10, upon calculation of the deck parameter values set for the battle decks in the battle game process of the poker game in this manner, the server device 10 transmits the screen data (HTML data) generated by the screen data generation unit 119 to the requesting player terminal 20 via the communication unit 15 (S109).

Subsequently, the player terminal 20 analyzes the screen data (HTML data) transmitted from the server device 10 to display a game screen corresponding to the screen data on the terminal display unit 24 (S110).

FIG. 12 (2) is a diagram illustrating an example of a battle screen 60 displayed on the terminal display unit 24. The battle screen 60 is a game screen for conducting a battle between the battle deck of the player and the battle deck of the opponent, and includes a first card placement area 61, a first poker hand display area 62, a first deck parameter display area 63, a second card placement area 64, a second poker hand display area 65, a second deck parameter display area 66, a game advancement button 67, and a recommended replacement button 68. The first card placement area 61 is an area for placing the battle deck of the player, in which the game cards included in the battle deck are placed in five unit areas 61A to 61E, respectively. The first poker hand display area 62 is an area for displaying a poker hand made by the battle deck of the player. The first deck parameter display area 63 is an area in which parameter information indicating the deck parameter value set for the battle deck of the player is displayed. The second card placement area 64 is an area for placing the battle deck of the opponent, in which the game cards included in the battle deck are placed in five unit areas 64A to 64E, respectively. The second poker hand display area 65 is an area for displaying a poker hand made by the battle deck of the opponent. The second deck parameter display area 66 is an area in which parameter information indicating the deck parameter value set for the battle deck of the opponent is displayed. The game advancement button 67 is an operation button for advancing the battle game. The recommended replacement button 68 is an operation button for the player to request presentation replacement cards selected automatically from the game cards included in the battle deck for the player.

In the present embodiment, since "three of a kind" is made by the battle deck of the player as illustrated in FIG. 12 (2), a deck parameter value resulting from the change by the parameter changing unit 116 (a value obtained by multiplying the sum of card parameters by the multiplier value "1.3"; see FIG. 9) is displayed as "1950" in the first deck parameter display area 63. Meanwhile, "two pair" is made by the battle deck of the opponent. In addition, a deck parameter value resulting from the change by the parameter changing unit 116 (a value obtained by multiplying the sum of card parameters by the multiplier value "1.2"; see FIG. 9) is displayed as "2400" in the second deck parameter display area 66. The player sees the battle screen 60 and finds out that there is a possibility of losing in this state since the deck parameter value ("1950") of the player is smaller than the deck parameter value ("2400") of the opponent. The player, however, can form a new battle deck by replacing game cards in the battle deck with game cards in the preliminary deck. If a new battle deck is formed, a poker hand stronger than "three of a kind" may be made or a poker hand weaker than that may be made by the new battle deck. There is even a possibility that no poker hand will be made. Thus, the player may come from behind and win or may totally lose as a result of replacing game cards. The player can select the game advancement button 67 or the recommended replacement button 68 taking these possibilities into account. Here, a case in which the recommended replacement button 68 is selected by the player will be described.

Subsequently, referring back to FIG. 10, when the recommended replacement button 68 is selected by the operation of the player while the battle screen 60 illustrated in FIG. 12 (2) is displayed on the terminal display unit 24, the player terminal 20 receives the selection input (S111). Thereafter, the player terminal 20 transmits a card replacement request to the server device 10 in response to the selection of the recommended replacement button 68 (S112).

Subsequently, as illustrated in FIG. 11, the server device 10 in receipt of the request executes a replacement card determination process (S113).

Figure 14:
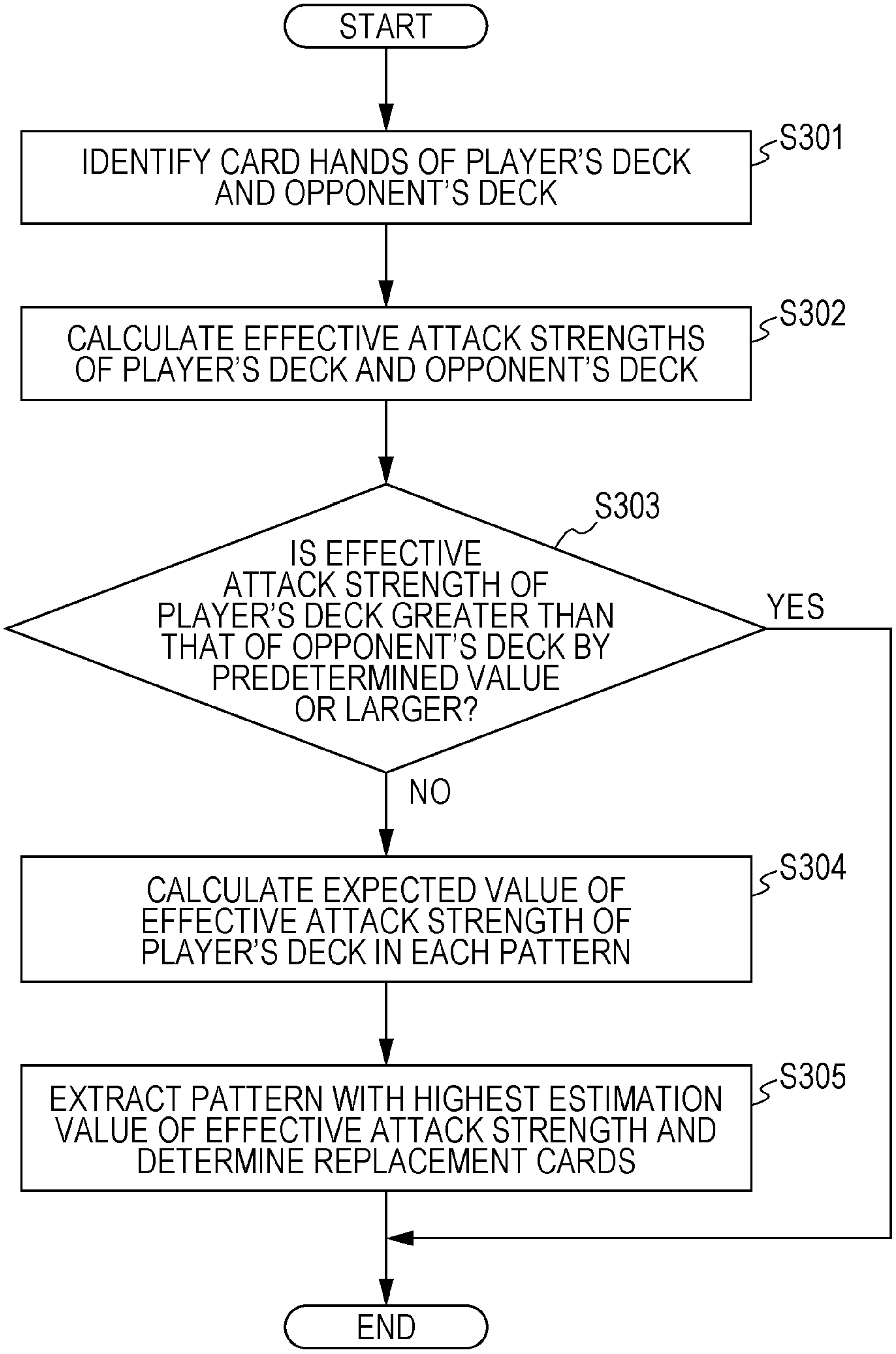
FIG. 14 is a flowchart explaining a replacement card determination process.

Hereinafter, the replacement card determination process will be specifically described with reference to FIGS. 14 and 15. FIG. 14 is a flowchart explaining the replacement card determination process. FIG. 15 is a table explaining patterns of battle decks formed as a result of replacement of game cards.

First, the replacement card determination unit 117 identifies the poker hands made by the battle deck of the player and by the battle deck of the opponent on the basis of the determination by the determination unit 112 on whether or not preset poker hands are made (S301). In the present embodiment, it is identified by the replacement card determination unit 117 that "three of a kind" is made by the player's battle deck while "two pair" is made by the opponent's battle deck as illustrated in FIG. 12 (2).

Subsequently, the replacement card determination unit 117 calculates effective attack strengths (effective ability values) of the player's battle deck and the opponent's battle deck (S302). The effective attack strengths of battle decks are each calculated by multiplying a sum of attack strengths of all the game cards included in the battle deck by the multiplier value associated with the poker hand identified in step 301. In the present embodiment, the replacement card determination unit 117 refers to the player information illustrated in FIG. 5, the possessed card information illustrated in FIG. 6, and the second deck information illustrated in FIG. 8 to acquire the attack strength of each of the game cards included in the player's battle deck and calculate the sum. The replacement card determination unit 117 then refers to the card hand information illustrated in FIG. 9 to acquire the multiplier value associated with the poker hand identified in step 301 and calculate the effective attack strength of the player's battle deck by multiplying the sum by the multiplier value. The effective attack strength of the opponent's battle deck is also calculated in the same manner.

Alternatively, the effective attack strength may be calculated by acquiring attack strengths of all the game cards (24 game cards) included in the preliminary deck, calculating the sum of all the attack strengths, and multiplying the sum by the multiplier value.

Subsequently, the determination unit 112 compares the effective attack strengths of the player's battle deck and the opponent's battle deck to determine whether or not the effective attack strength of the player's battle deck is greater than that of the opponent's battle deck by a predetermined number or larger (S303).

If the determination in step 303 by the determination unit 112 is positive (S303: YES), this process is terminated. Specifically, since the player's battle deck is more advantageous than that of the opponent, the replacement card determination process is terminated without determining game cards to be replaced.

If, on the other hand, the determination in step 303 by the determination unit 112 is negative (S303: NO), the replacement card determination unit 117 calculates an expected value of the effective attack strength for each pattern of battle deck that can be formed as a result of game card replacement (S304)

Specifically, in the present embodiment, the player's battle deck includes five cards of "9 of diamonds", "9 of hearts", "9 of spades", "10 of clubs", and "A of spades" as illustrated in FIG. 12 (2). The replacement card determination unit 117 selects five or less game cards that are candidates for replacement (hereinafter also referred to as "replacement candidate cards") out of the battle deck composed of these five game cards, and calculates an expected value of the attack strength for each pattern of the battle deck that can be made if the selected replacement candidate cards are replaced.

An expected value of the effective attack strength is obtained by calculating an assumed effective attack strength for each pattern of battle deck that can be formed as a result of replacement with each of the game cards (19 game cards) remaining in the preliminary deck, and averaging the calculated assumed effective attack strengths. In the present embodiment, the average value of the assumed effective attack strengths is equivalent to the expected value of the effective attack strength.

The assumed effective attack strength is calculated by multiplying the sum of attack strengths (see FIGS. 7 and 8) of all the game cards (five game cards) included in the battle deck that can be formed by the multiplier value (see FIG. 9) associated with the poker hand that can be made by the battle deck. Alternatively, the assumed effective attack strength may be calculated by acquiring attack strengths of all the game cards (24 game cards) included in the preliminary deck, calculating the sum of all the attack strengths, and multiplying the sum by the multiplier value.

Note that the patterns of battle deck that can be formed by replacing five or less replacement candidate cards are as shown in FIG. 15. Specifically, a pattern of battle deck that can be formed by replacing zero replacement candidate cards is identical to that of the battle deck without card replacement, and thus the number of new battle deck patterns is one. Patterns of battle deck that can be formed by replacing one replacement candidate card correspond to combinations of selecting one game card from five game cards without repetition, and thus the number of new battle deck patterns if five. Specifically, there are five patterns of battle deck that can be formed, which are a case where "9 of diamonds" is selected as a replacement candidate card, a case where "9 of hearts" is selected as a replacement candidate card, a case where "9 of spades" is selected as a replacement candidate card, a case where "10 of clubs" is selected as a replacement candidate card, and a case where "A of spades" is selected as a replacement candidate card. Similarly, the number of patterns of battle deck that can be formed by replacing two replacement candidate cards is ten. The number of patterns of battle deck that can be formed by replacing three replacement candidate cards is ten. The number of patterns of battle deck that can be formed by replacing four replacement candidate cards is five. The number of patterns of battle deck that can be formed by replacing five replacement candidate cards is one.

A replacement candidate card can be replaced by each of the 19 game cards remaining in the preliminary deck (game cards remaining as a result of removing five game cards composing the battle deck out of the 24 game cards in the preliminary deck). Thus, for example, replacement patterns resulting from replacing one replacement candidate card in the battle deck with one game card in the preliminary deck correspond to combinations of selecting one game card from 19 game cards without repetition, and thus the number of replacement patterns is 19. Replacement patterns resulting from replacing two replacement candidate cards in the battle deck with two game card in the preliminary deck correspond to combinations of selecting two game cards from 19 game cards without repetition, and thus the number of replacement patterns is 171. Replacement patterns resulting from replacing three replacement candidate cards in the battle deck with three game card in the preliminary deck correspond to combinations of selecting three game cards from 19 game cards without repetition, and thus the number of replacement patterns is 969. Replacement patterns resulting from replacing four replacement candidate cards in the battle deck with four game card in the preliminary deck correspond to combinations of selecting four game cards from 19 game cards without repetition, and thus the number of replacement patterns is 3876. Replacement patterns resulting from replacing all the five replacement candidate cards in the battle deck with five game card in the preliminary deck correspond to combinations of selecting five game cards from 19 game cards without repetition, and thus the number of replacement patterns is 11628.

Thus, if one replacement candidate card in the battle deck is to be replaced by one game card in the preliminary deck, the number of patterns of battle deck that can be formed is five, and the replacement card determination unit 117 calculates an expected value of the effective attack strength of each of the five battle decks. For calculating the expected value of the effective attack strength of each of the five battle decks, since the number of replacement patterns of the replacement candidate card is 19, 19 assumed effective attack strengths are precalculated, an average value is obtained from the 19 precalculation results, and the average value is used as the expected value of the effective attack strength. Note that part or the whole of the range of the assumed effective attack strength from the lowest value to the highest value may be used as the expected value of the effective attack strength.

If two replacement candidate cards in the battle deck are to be replaced by two game cards in the preliminary deck, the number of patterns of battle deck that can be formed is ten, and the replacement card determination unit 117 calculates an expected value of the effective attack strength of each of the ten battle decks. For calculating the expected value of the effective attack strength of each of the ten battle decks, since the number of replacement patterns of the replacement candidate cards is 171, 171 assumed effective attack strengths are precalculated, an average value is obtained from the 171 precalculation results, and the average value is used as the expected value of the effective attack strength. Note that part or the whole of the range of the assumed effective attack strength from the lowest value to the highest value may be used as the expected value of the effective attack strength.

If three replacement candidate cards in the battle deck are to be replaced by three game cards in the preliminary deck, the number of patterns of battle deck that can be formed is ten, and the replacement card determination unit 117 calculates an expected value of the effective attack strength of each of the ten battle decks. For calculating the expected value of the effective attack strength of each of the ten battle decks, since the number of replacement patterns of the replacement candidate cards is 969, 969 assumed effective attack strengths are precalculated, an average value is obtained from the 969 precalculation results, and the average value is used as the expected value of the effective attack strength. Note that part or the whole of the range of the assumed effective attack strength from the lowest value to the highest value may be used as the expected value of the effective attack strength.

If four replacement candidate cards in the battle deck are to be replaced by four game cards in the preliminary deck, the number of patterns of battle deck that can be formed is five, and the replacement card determination unit 117 calculates an expected value of the effective attack strength of each of the five battle decks. For calculating the expected value of the effective attack strength of each of the five battle decks, since the number of replacement patterns of the replacement candidate cards is 3876, 3876 assumed effective attack strengths are precalculated, an average value is obtained from the 3876 precalculation results, and the average value is used as the expected value of the effective attack strength. Note that part or the whole of the range of the assumed effective attack strength from the lowest value to the highest value may be used as the expected value of the effective attack strength.

If five replacement candidate cards in the battle deck are to be replaced by five game cards in the preliminary deck, the number of patterns of battle deck that can be formed is one, and the replacement card determination unit 117 calculates an expected value of the effective attack strength of the one battle deck. For calculating the expected value of the effective attack strength of the one battle deck, since the number of replacement patterns of the replacement candidate cards is 11628, 11628 assumed effective attack strengths are precalculated, an average value is obtained from the 11628 precalculation results, and the average value is used as the expected value of the effective attack strength. Note that part or the whole of the range of the assumed effective attack strength from the lowest value to the highest value may be used as the expected value of the effective attack strength.

After the expected values of the effective attack strength are calculated for the respective patterns of battle deck that can be formed, the replacement card determination unit 117 extracts a pattern of battle deck with the highest expected value of the effective attack strength, and determines the replacement candidate card(s) in the extracted battle deck to be the replacement card(s).

In the present embodiment, as illustrated in FIG. 15, the average value (the expected value of the effective attack strength) of the assumed effective attack strengths is calculated for each of the patterns of battle deck that can be formed. In this case, the highest value of the calculated average values (the expected values of the effective attack strengths) of the assumed effective attack strengths is "3600". The pattern of battle deck with the highest average value (expected value of the effective attack strength) of the assumed effective attack strengths is a pattern of battle deck that can be formed by replacing four replacement candidate cards of "9 of diamonds", "9 of hearts", "9 of spades", and "10 of clubs". Four replacement candidate cards of "9 of diamonds", "9 of hearts", "9 of spades", and "10 of clubs" are thus determined to be replacement cards.

As can be seen from the above, in the present embodiment, since the possibility that the player's battle deck will be more advantageous than the opponent's battle deck is higher when "three of a kind" is broken and only "A of spades" is held rather than when "9 of diamonds", "9 of hearts", and "9 of spades" are held to maintain the poker hand "three of a kind", the four replacement candidate cards are proposed for replacement.

Subsequently, referring back to FIG. 11, after the replacement cards are determined in the replacement card determination process in this manner, the server device 10 transmits screen data (HTML data) generated by the screen data generation unit 119 to the requesting player terminal 20 via the communication unit 15 (S114).

The player terminal 20 then analyzes the screen data (HTML data) transmitted from the server device 10 to display a game screen corresponding to the screen data on the terminal display unit 24 (S115).

FIG. 12 (3) is a diagram illustrating an example of a battle screen 60 displayed on the terminal display unit 24. The battle screen 60 displays proposal information recommending the player to replace the replacement cards determined in the replacement card determination process in the first card placement area 61. Specifically, "9 of diamonds", "9 of hearts", "9 of spades", and "10 of clubs" are placed on the four unit areas 61A to 61D, respectively, and emphasized (shown with thick frames) to recommend the player to replace the four cards. In this case, the expected value of the effective attack strength when the four cards are replaced may be displayed on the battle screen 60 (for example, displayed as "expected power after card replacement: 3600").

If the player accepts the recommended replacement of cards and continues the battle game, the player then selects only the game advancement button 67. If, on the other hand, the player does not accept the recommended replacement of cards, the player reselects cards to be replaced by himself/herself (selects "HOLD" or cancel "HOLD" to reselect cards by touch operation) and then selects the game advancement button 67. Here, the description will be made on the case where the player accepts the recommended replacement of cards and continues the battle game, that is, the case where only the game advancement button 67 is selected by the player.

Subsequently, when the game advancement button 67 is selected by the operation of the player while the battle screen 60 illustrated in FIG. 12 (3) is displayed on the terminal display unit 24, the player terminal 20 receives the selection input (S116). Thereafter, the player terminal 20 transmits a battle advancement request to the server device 10 in response to the selection of the game advancement button 67 (S117).

Subsequently, upon receiving the battle advancement request, the server device 10 executes a second deck forming process (S118) and then executes a win/loss determination process of determining the outcome of the battle game (S119).

In the second deck formation, the second deck forming unit 114B refers to the player information illustrated in FIG. 5 and the first deck information illustrated in FIG. 7 to select game cards, the number of game cards corresponding to the number of game cards to be replaced, from the preliminary deck of the player. In the present embodiment, since four game cards are to be replaced (see FIG. 12 (3)), four game cards are randomly selected from 19 game cards in the preliminary deck (since five cards are already selected, not 24 but 19 game cards are candidates for selection in the preliminary deck). The second deck forming unit 114B then associates the four selected game cards with the unit areas 61A to 61D, respectively, in the card placement area 61. The second deck forming unit 114B then forms a new battle deck of five game cards put into a set. After the new battle deck is formed in this manner, the second deck information illustrated in FIG. 8 is updated and stored in the data storage unit 12 of the server device 10.

The server device 10 then executes a process of recalculating deck parameter value set for the battle deck of the player. Specifically, the process of calculating the deck parameter illustrated in FIG. 13 is executed again to calculate the deck parameter value determined by the parameter determination unit 115 or the deck parameter value resulting from the change by the parameter changing unit 116 for the battle deck of the player.

Subsequently, in the win/loss determination process, the battle processing unit 118 determines the outcome of the battle game by using the deck parameter value determined by the parameter determination unit 115 or the deck parameter value resulting from the change by the parameter changing unit 116. More specifically, the battle processing unit 118 compares the deck parameter value set for the battle deck of the player and the deck parameter value set for the battle deck of the opponent, and determines one having the larger deck parameter value to be the winner and the other having the smaller deck parameter value to be the loser.

Note that the battle processing unit 118 changes the card parameter values (such as attack strengths) of the game cards included in the battle deck according to the win/loss result. As a result, the combination of game cards included in the preliminary decks for a next battle can be changed each time a battle is conducted. Specifically, the kinds of game cards to be candidates for selection in formation of battle decks can be changed.

Subsequently, after the outcome is determined by the battle game process for the poker game in this manner, the server device 10 transmits screen data (HTML data) generated by the screen data generation unit 119 to the requesting player terminal 20 via the communication unit 15 (S120).

Subsequently, the player terminal 20 analyzes the screen data (HTML data) transmitted from the server device 10 to display a game screen corresponding to the screen data on the terminal display unit 24 (S121).

Figure 16:
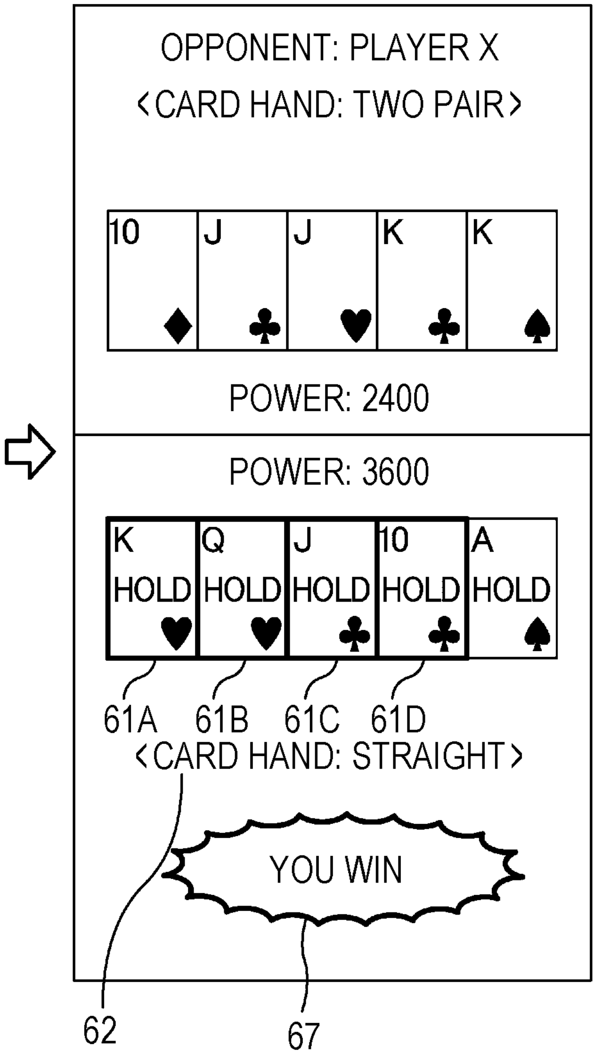
FIG. 16 is a diagram explaining screen transition (second half) in the battle game.

FIG. 16 (4) is a diagram illustrating a state after card replacement of the battle screen 60 displayed on the terminal display unit 24. On the battle screen 60, since four game cards placed in the unit areas 61A to 61D are selected to be replaced on the battle screen 60 illustrated in FIG. 12 (3), the game cards resulting from the replacement are newly placed on the unit areas 61A to 61D as illustrated in FIG. 16 (4). In the present embodiment, as a result of performing card replacement as recommended, a poker hand "straight" is newly made by the battle deck of the player and, successfully leading the player to winning from behind.

As described above, with the game system 1 according to the present embodiment, five or less replacement cards are automatically determined out of five game cards included in the player's battle deck, and proposal information recommending the player to replace the determined replacement cards is displayed on a game screen. As a result, even when it is difficult for the player to determine which of five game cards included in the battle deck should be selected as replacement cards, the player can easily determine the replacement cards.

Other Embodiments

The above-described embodiment has been given for easy understanding of the present invention, and is not to construe the present invention in a limited manner. The present invention can be modified and improved without departing from the gist of the invention and includes its equivalents. In particular, embodiments described below are also included in the present invention.

<Battle Game>

In the above-described embodiment, an example of the poker game is described as an example of the battle game, but the present invention is not limited thereto and the battle game may be other card games, mah-jong, Hanafuda (Japanese playing cards) or the like.

<Proposal Information>

In the above-described embodiment, an example in which replacement cards are emphasized in the first card placement area 61 as illustrated in FIG. 12 (3) as one example of proposal information recommending the player to replace the replacement cards determined by the replacement card determination unit 117 is described, but the present invention is not limited thereto. For example, the replacement cards may be displayed with markings on the screen or a text recommending card replacement to the player may be displayed on the screen.

Alternatively, instead of proposal of replacement cards, a game screen containing an expected value of the effective attack strength associated with replacement candidate cards may be displayed each time cards to be replaced or held are selected by the player (each time replacement candidate cards are selected according to selection input by the player) before the game advancement button 67 is selected (For example, FIG. 12 (3)). As a result, the player can determine the replacement cards by referring to the expected values of the effective attack strength before conducting card replacement. In this case, a range from the lowest value to the highest value of assumed effective attack strengths may be displayed on the screen as the expected value of the effective attack strength instead of the average value of the assumed effective attack strengths.

<Formation of Battle Deck>

In the above-described embodiment, an example in which the second deck forming unit 114B randomly selects game cards at a given probability from a preliminary deck for forming a battle deck is described, but the present invention is not limited thereto. For example, the probability for selection may be changed depending on the kind of the number attribute set for a game card. Specifically, the probability may be set so that game cards having any of three number attributes of 12 (queen: Q), 13 (king: K), and 1 (ace: A) are less likely to be selected than the other three number attributes among the six number attributes of 9, 10, 11 (jack: J), 12 (queen: Q), 13 (king: K), and 1 (ace: A).

<Replacement Card Determination Process>

In the above-described embodiment, an example in which the replacement card determination process (S113) is executed as a result of selecting the recommended replacement button 68 by the player (S111) is described as illustrated in FIGS. 10 and 11, but the replacement card determination process (S113) may be executed immediately after calculation of parameter values (S108) without selection of the recommended replacement button 68 by the player. Thus, in such a case, steps 109 to 112 are omitted.

Furthermore, in the above-described embodiment, an example in which an expected value of the effective attack strength is calculated for each pattern of battle deck that can be formed and replacement candidate cards with the highest calculated expected value of the effective attack strength are then determined to be replacement card is described as illustrated in FIG. 15, but the present invention is not limited thereto. For example, the replacement card determination unit 117 may determine some or all of replacement candidate cards with high calculated expected values of the effective attack strengths such as those in patterns with the expected values of the effective attack strength "3600", "3510", and "3250" as illustrated in FIG. 15. In such a case, a threshold (for example, the effective attack strength of the opponent or a predetermined value such as 3000) may be set for specifying high expected values of the effective attack strength.

Furthermore, since the player aims at beating the opponent, some or all of replacement candidate cards with the expected value of the effective attack strength higher than the effective attack strength of the opponent or replacement candidate cards with a pattern having an assumed effective attack strength higher than the effective attack strength of the opponent in the patterns of battle deck that can be formed may be determined to be replacement cards in the replacement card determination process.

<Expected Value of Effective Attack Strength>

In the above-described embodiment, an example in which an expected value of the effective attack strength is an example of an expected value of an effective parameter calculated by the replacement card determination unit 117 is described, the present invention is not limited thereto. For example, an expected value of an effective defense strength may be calculated by using the a defense strength parameter of game cards included in the battle deck or an expected value of an effective hit point may be calculated by using a hit point parameter of game cards included in the battle deck.

<Calculation of Expected Value of Effective Attack Strength>

In the above-described embodiment, an expected value of the effective attack strength needs to be calculated for each pattern of battle deck that can be formed if replacement candidate cards are replaced in the replacement card determination process. In a case where four replacement candidate cards in the battle deck are to be replaced with four game cards in the preliminary deck or in a case where five replacement candidate cards in the battle deck are to be replaced with five game cards in the preliminary deck, the number of patterns of replacement candidate cards is 3876 or 11628, which increases the calculation cost. In such a case, an expected value of the effective attack strength may be calculated as follows.

The replacement card determination unit 117 calculates in advance an average attack strength obtained by adding up and averaging the attack strengths of all the 24 game cards included in the preliminary deck and an average multiplier value obtained by adding up and averaging multiplier values of poker hands that can be made by all the 24 game cards at timing when the first deck forming unit 114 A forms a preliminary deck, or the like. The replacement card determination unit 117 then multiplies the average attack strength by the average multiplier value to calculate the expected value of the effective attack strength of the battle deck. As a result, it is possible to obtain an approximate value while reducing the calculation cost. Alternatively, the calculation for those with high calculation cost may be skipped, an expected value of the effective attack strength may be calculated for the number of replacement candidate cards being 0 to 3.

<Server Device>

In the above-described present embodiment, the game system 1 provided with one server device 10 as an example of a server device has been exemplarily described. However, the game system 1 is not limited to this example, and may be provided with a plurality of server devices 10 as an example of the server device. Specifically, a plurality of server devices 10 may be connected through a network 2, and each of the server devices 10 may execute various types of processing in a distributed manner.

<Information Processing Device>

In the game system 1 in the above-described embodiment, an example in which various types of information processing are executed on the basis of a game program by the server device 10 and the player terminal 20 in cooperation with each other is described. However, the game system 1 is not limited to the example. The various types of information processing may be executed by the player terminal 20 alone or by the server device 10 alone as an information processing device on the basis of a game program.

Furthermore, the player terminal 20 may bare some of the functions of the information processing device. In this case, the server device 10 and the player terminal 20 constitute the information processing device.

Note that the information processing device is an example of a computer provided with a processor and a memory.

What is claimed is:

1. An information processing device comprising:

a storage unit configured to store multiple game contents;

a deck forming unit configured to select a predetermined number of game contents from the multiple game contents to form a deck to be used in a game by a player;

a replacement content determination unit configured to determine a predetermined number or less of game contents out of the predetermined number of game contents included in the deck to be game contents to be replaced; and a screen data generation unit configured to generate data of a game screen containing proposal information recommending the player to replace the game contents to be replaced, wherein the replacement content determination unit, selects a predetermined number or less of replacement candidate game contents out of the predetermined number of game contents included in the deck, calculates in advance, for each pattern of replacement candidates, an assumed effective parameter value of each of possible decks that can be formed if the selected replacement candidate game contents are replaced by using parameter values set for each of game contents included in the possible deck, wherein the parameter values set for the each of the game contents included in the possible deck are associated with an attack value, wherein the assumed effective parameter value is calculated based on the attack value and a multiplier associated with a combination of game contents, obtains an expected value of an effective parameter value on the basis of the calculated assumed effective parameter values, and determines the replacement candidate game contents with a highest expected value of the effective parameter value to be the game contents to be replaced.

2. An information processing device comprising:

a storage unit configured to store multiple game contents;

a deck forming unit configured to select a predetermined number of game contents from the multiple game contents to form a deck to be used in a game by a player;

a replacement content determination unit configured to determine a predetermined number or less of game contents out of the predetermined number of game contents included in the deck to be game contents to be replaced; and a screen data generation unit configured to generate data of a game screen containing proposal information recommending the player to replace the game contents to be replaced, wherein the replacement content determination unit, selects a predetermined number or less of replacement candidate game contents out of the predetermined number of game contents included in the deck, calculates in advance, for each pattern of replacement candidates, an assumed effective parameter value of each of possible decks that can be formed if the selected replacement candidate game contents are replaced by using parameter values set for each of game contents included in the possible deck, wherein the parameter values set for the each of the game contents included in the possible deck are associated with an attack value, wherein the assumed effective parameter value is calculated based on the attack value and a multiplier associated with a combination of game contents, obtains an expected value of an effective parameter value on the basis of the calculated assumed effective parameter values, specifies some or all patterns of replacement candidates with high expected values of the effective parameter values, and determines the replacement candidate game contents in the specified patterns of replacement candidates to be the game contents to be replaced.

3. The information processing device according to claim 1, wherein the deck forming unit selects a predetermined number of game contents from the multiple game contents to form a player's deck to be used in a game by a player and form an opponent's deck to be used in the game by an opponent, the replacement content determination unit calculates an effective parameter value of the player's deck by using parameter values set for the respective game contents included in the player's deck and calculates an effective parameter value of the opponent's deck by using parameter values set for the respective game contents included in the opponent's deck, the information processing device further comprises a determination unit configured to determine whether or not the effective parameter value of the opponent's deck is greater than that of the player's deck, and when the effective parameter value of the opponent's deck is determined to be greater than that of the player's deck, the replacement content determination unit further determines game contents to be replaced from the player's deck.

4. The information processing device according to claim 1, wherein the screen data generation unit generates data of a game screen containing the obtained expected values of the effective parameter values before the replacement candidate game contents are determined to be game contents to be replaced in response to an operation input by the player.

5. An information processing device comprising:

a storage unit configured to store multiple game contents;

a deck forming unit configure to select a predetermined number of game contents from the multiple game contents to form a player's deck to be used in a game by a player and form an opponent's deck to be used in the game by an opponent;

a replacement content determination unit configured to determine a predetermined number or less of game contents out of the predetermined number of game contents included in the player's deck to be game contents to be replaced; and a screen data generation unit configured to generate data of a game screen containing proposal information recommending the player to replace the game contents to be replaced, wherein the replacement content determination unit, calculates an effective parameter value of the opponent's deck by using parameter values set for the respective game contents included in the opponent's deck, selects a predetermined number or less of replacement candidate game contents out of the predetermined number of game contents included in the player's deck, calculates an assumed effective parameter value of each of possible player's decks that can be formed if the selected replacement candidate game contents are replaced by using parameter values set for each of game contents included in the possible player's deck, wherein parameter values set for the each of the game contents included in the possible deck are associated with an attack value, wherein the assumed effective parameter value is calculated based on the attack value and a multiplier associated with a combination of game contents, specifies a possible player's deck with the assumed effective parameter value higher than the effective parameter value of the opponent's deck, and determines the replacement candidate game contents for the specified possible player's deck to be the game contents to be replaced.

6. A non-transitory computer-readable storage medium storing a game program causing a computer to execute:

a storage process of storing multiple game contents in a storage unit;

a deck forming process of selecting a predetermined number of game contents from the multiple game contents to form a deck to be used in a game by a player;

a replacement game content determination process of determining a predetermined number or less of game contents out of the predetermined number of game contents included in the deck to be game contents to be replaced; and a screen data generation process of generating data of a game screen containing proposal information recommending the player to replace the game contents to be replaced, wherein the replacement game content determination process includes:

selecting a predetermined number or less of replacement candidate game contents out of the predetermined number of game contents included in the deck;

calculating in advance, for each pattern of replacement candidates, an assumed effective parameter value of each of possible decks that can be formed if the selected replacement candidate game contents are replaced by using parameter values set for each of game contents included in the possible deck, wherein the parameter values set for the each of the game contents included in the possible deck are associated with an attack value, wherein the assumed effective parameter value is calculated based on the attack value and a multiplier associated with a combination of game contents, and obtaining an expected value of an effective parameter value on the basis of the calculated assumed effective parameter values; and determining the replacement candidate game contents with a highest expected value of the effective parameter value to be the game contents to be replaced.

7. A non-transitory computer-readable storage medium storing a game program causing a computer to execute:

a storage process of storing multiple game contents in a storage unit;

a deck forming process of selecting a predetermined number of game contents from the multiple game contents to form a deck to be used in a game by a player;

a replacement game content determination process of determining a predetermined number or less of game contents out of the predetermined number of game contents included in the deck to be game contents to be replaced; and a screen data generation process of generating data of a game screen containing proposal information recommending the player to replace the game contents to be replaced, wherein the replacement game content determination process includes:

selecting a predetermined number or less of replacement candidate game contents out of the predetermined number of game contents included in the deck;

calculating in advance, for each pattern of replacement candidates, an assumed effective parameter value of each of possible decks that can be formed if the selected replacement candidate game contents are replaced by using parameter values set for each of game contents included in the possible deck, wherein the parameter values set for the each of the game contents included in the possible deck are associated with an attack value, wherein the assumed effective parameter value is calculated based on the attack value and a multiplier associated with a combination of game contents, and obtaining an expected value of an effective parameter value on the basis of the calculated assumed effective parameter values; and specifying some or all patterns of replacement candidates with high expected values of the effective parameter values, and determining the replacement candidate game contents in the specified patterns of replacement candidates to be the game contents to be replaced.

8. A non-transitory computer-readable storage medium storing a game program causing a computer to execute:

a storage process of storing multiple game contents in a storage unit;

a deck forming process of selecting a predetermined number of game contents from the multiple game contents to form a player's deck to be used in a game by a player and form an opponent's deck to be used in the game by an opponent;

a replacement game content determination process of determining a predetermined number or less of game contents out of the predetermined number of game contents included in the player's deck to be game contents to be replaced; and a screen data generation process of generating data of a game screen containing proposal information recommending the player to replace the game contents to be replaced, wherein the replacement game content determination process includes:

calculating an effective parameter value of the opponent's deck by using parameter values set for the respective game contents included in the opponent's deck, selecting a predetermined number or less of replacement candidate game contents out of the predetermined number of game contents included in the player's deck;

calculating an assumed effective parameter value of each of possible player's decks that can be formed if the selected replacement candidate game contents are replaced by using parameter values set for each of game contents included in the possible player's deck, wherein the parameter values set for the each of the game contents included in the possible deck are associated with an attack value, wherein the assumed effective parameter value is calculated based on the attack value and a multiplier associated with a combination of game contents, and specifying a possible player's deck with the assumed effective parameter value higher than the effective parameter value of the opponent's deck, and determining the replacement candidate game contents with a highest expected value of the effective parameter value to be the game contents to be replaced.

* * * * *